April 5, 1960
J. D. MANGUM
2,931,337
MECHANICAL CHICKEN FEEDER
Filed Aug. 22, 1958
2 Sheets-Sheet 1
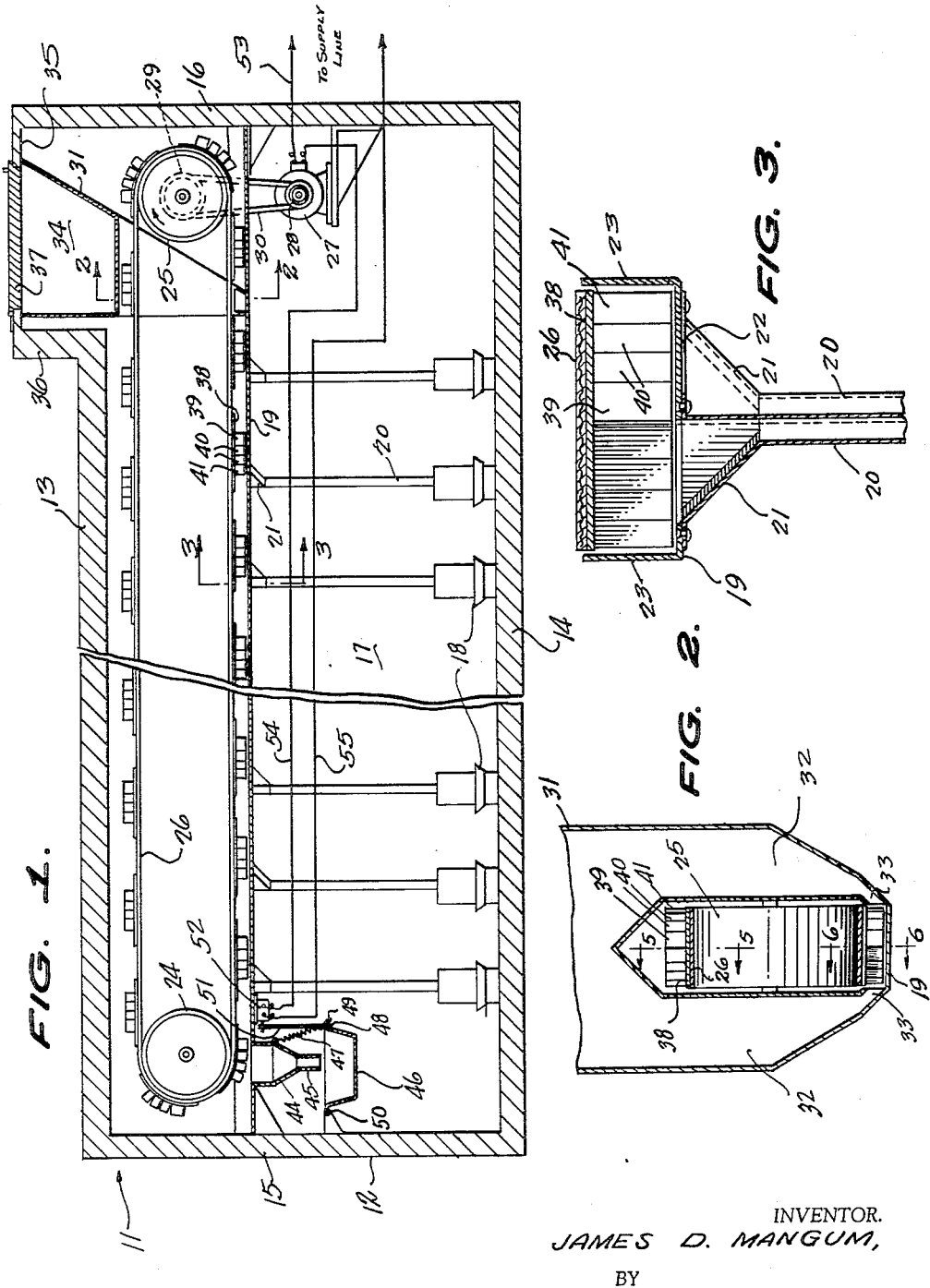
INVENTOR.
JAMES D. MANGUM,
BY
McMorrow, Berman + Davidson
ATTORNEYS.

April 5, 1960
J. D. MANGUM
2,931,337
MECHANICAL CHICKEN FEEDER
Filed Aug. 22, 1958
2 Sheets-Sheet 2
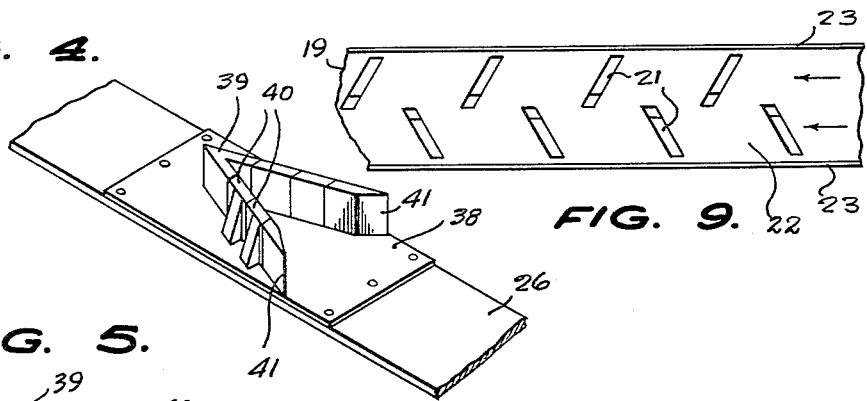
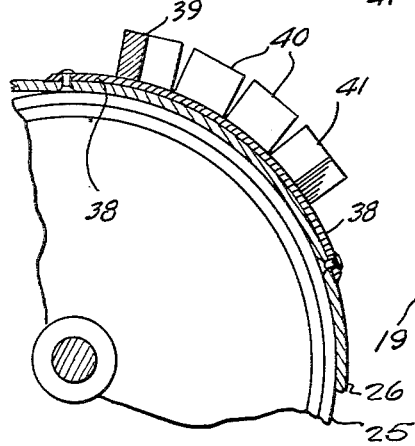
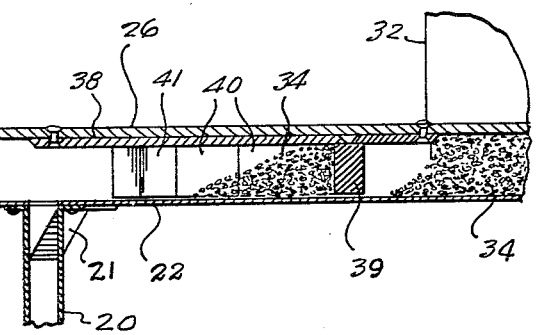
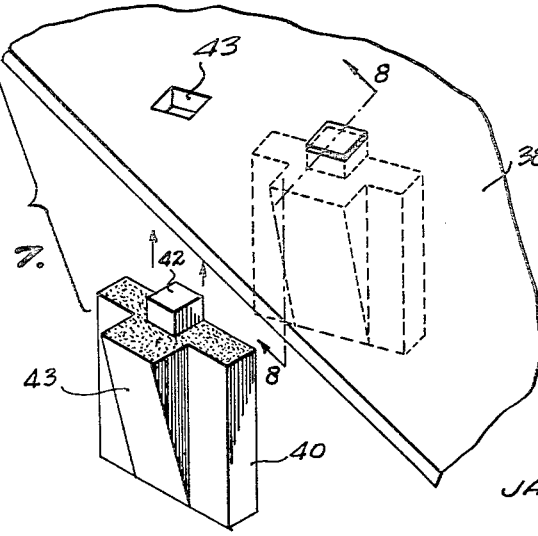
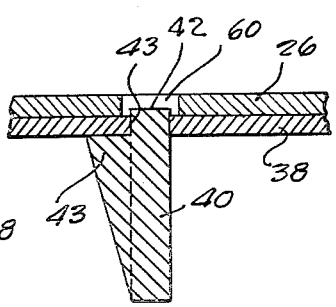
INVENTOR.
JAMES D. MANGUM,
BY
McMorrow, Berman + Davidson
ATTORNEYS.

2,931,337

MECHANICAL CHICKEN FEEDER

James D. Mangum, Mendenhall, Miss.

Application August 22, 1958, Serial No. 756,622

4 Claims. (Cl. 119—52)

This invention relates to poultry feeders, and more particularly to an automatic chicken feeder of the type employing an endless conveyor belt for distributing the feed material to a plurality of chicken feeding troughs.

A main object of the invention is to provide a novel and improved automatic feeding device for supplying predetermined quantities of feed material to a plurality of chicken feeding troughs, the device being simple in construction, being relatively compact in size, and being provided with means for automatically terminating operation thereof when all of the individual feeding troughs have been provided with the proper amount of feed material.

A further object of the invention is to provide an improved mechanically operated chicken feeder which involves relatively inexpensive components, which is durable in construction, which is reliable in operation, and which requires a minimum amount of human supervision.

Further objects and advantages of the invention will become apparent from the following description and claims, and from the accompanying drawings, wherein:

Figure 1 is a vertical, fragmentary, longitudinal cross sectional view taken through an improved chicken feeder constructed in accordance with the present invention.

Figure 2 is an enlarged fragmentary vertical cross sectional view taken on the line 2—2 of Figure 1.

Figure 3 is an enlarged fragmentary vertical cross sectional view taken on the line 3—3 of Figure 1.

Figure 4 is an enlarged fragmentary perspective view of a portion of the endless conveyor belt employed in the chicken feeder illustrated in Figures 1, 2 and 3.

Figure 5 is an enlarged longitudinal vertical cross sectional view taken through an end portion of the conveyor structure associated with the chicken feeder illustrated in Figure 1, said view being taken on the line 5—5 of Figure 2.

Figure 6 is an enlarged longitudinal fragmentary vertical cross sectional view taken substantially on the line 6—6 of Figure 2.

Figure 7 is an enlarged fragmentary perspective view showing one side marginal portion of the flexible endless conveyor belt associated with the chicken feeder of Figure 1, and showing one of the distributing finger elements associated therewith in separated relationship with respect to the belt, and illustrating the manner in which the finger element is assembled with the belt.

Figure 8 is a vertical cross sectional view taken on the line 8—8 of Figure 7.

Figure 9 is a fragmentary horizontal plan view showing a portion of the feed distributing trough employed in the feeder of Figures 1 to 8.

Referring to the drawings, 11 generally designates an automatic chicken feeder according to the present invention. The feeder 11 comprises a housing 12 provided with a top wall 13, a bottom wall 14, a front end wall 15, a rear end wall 16 and respective side walls 17. The housing is provided with suitable doorway openings to allow the entry and exit of poultry and is provided with a plurality of feed troughs 18 disposed on the bottom wall 14 and spaced longitudinally along said bottom wall, as shown in Figure 1.

Designated at 19 is a horizontal, longitudinally extending distributing trough which is mounted in the housing 12 above the feed trough 18 and which is provided with respective, longitudinally spaced conduits 20 connecting the distributing troughs to the feed trough 18. As shown in Figures 1 and 2, the conduit 20 communicates with the distributing trough 19 by alternating triangular chute members 21, said chute members being alternately connected so as to communicate with opposite side portions of the distributing trough 19. Thus, as shown in Figure 9, the respective chute members 21 are staggered along the distributing trough 19 and are alternately arranged at the opposite side portions of said trough. Furthermore, the chute elements 21 are inclined in the manner illustrated in Figure 9, extending from the center portion of the trough laterally and rearwardly therefrom.

As will be readily apparent from Figures 1 and 9, the trough 19 comprises the horizontal bottom wall 22 and respective longitudinally extending upstanding vertical side flanges 23, 23, whereby the trough has a generally channel-shaped structure.

Designated at 24 and 25 are respective supporting rollers journaled at the forward and rear ends of housing 12, and mounted on said rollers is a flexible endless conveyor belt 26 which is disposed above the distributing trough 19 with its bottom run located adjacent to and parallel to the bottom wall 22 of the distributing trough. An electric motor 27 is mounted on a supporting bracket 28 secured to the rear wall 16, the motor being provided with a suitable drive pulley 28 which is coupled to the driven pulley 29 connected to roller 25 by a drive belt 30. When energized, the motor 27 rotates the pulley 28 in a direction to drive roller 25 clockwise, as viewed in Figure 1, whereby to move the bottom run of the flexible conveyor belt 26 from the rear portion of housing 12 toward the forward portion thereof.

Designated at 31 is a hopper which is mounted in the rear portion of housing 12 above the rear end portion of the conveyor belt 26, said hopper being provided with respective depending side conduit portions 32, 32 extending adjacent the opposite sides of the conveyor belt 26 and terminating at the inwardly directed bottom discharge spout elements 33, 33 extending through the side flanges of the distributing trough 19 and communicating with said distributing trough so that feed material 34 placed in the hopper 31 will gravitate onto the distributing trough 19 from the opposite sides thereof through the respective conduit portions 32, 32, of hopper 31.

Hopper 31 extends upwardly to the top wall portion 35 of the upstanding end 36 of housing 12, said top wall 35 being provided with a hinged cover 37 which may be opened to allow access to the interior of hopper 31 for the purpose of supplying same with feed material.

Secured on the flexible conveyor belt 26 in longitudinally spaced relation thereon are respective flexible supporting plate members 38, comprising sheets of flexible plastic material, or the like, said supporting plates having secured thereon respective groups of outwardly projecting distributing blocks arranged in generally V-shaped configurations, as illustrated in Figure 4. Each group of distributing blocks comprises a generally V-shaped apex block 39, a pair of successive side blocks 40 and respective forwardly tapering end blocks 41, said tapering end blocks diverging forwardly on the bottom run of the conveyor belt 26 and being adapted to engage feed material disposed on the distributing trough 19 and to move the feed material forwardly so that the material will enter the longitudinally spaced chute members 21 and flow into the conduits 20.

The respective blocks are secured to the plate members 38 in any suitable manner, for example, by the provision of square bottom studs 42 on the blocks which engage in square apertures 43 formed in the plate members 38, the studs 42 and the bottom surfaces of the blocks being secured to the plate members 38 by means of suitable cement, or by any other suitable fastening means.

The side blocks 40 are formed with triangular brace ribs 43' whose bottom surfaces are flush with the bottom surfaces of the main portions of the block 40 and which are likewise adhesively secured to the plate member 38 by suitable adhesive or by any other suitable means, as above described.

As shown in Figure 5, blocks 39, 40 and 41 diverge when the adjacent conveyor belt portion passes over the rollers 24 and 25 but come together when the associated belt portion assumes a horizontal position.

As shown in Figure 6, the blocks 39, 40 and 41 are of sufficient length so that they extend almost into engagement with the bottom wall 22 of the distributing trough 19 and thus act as scoops to move the grain material 34 forwardly toward the conduit portions 21 associated with the respective conduit 20.

The distributing trough 19 is provided at its forward end with a discharge conduit 44 having the vertical bottom spout 45. Pivoted to the forward wall 15 of the housing 12 is a receiving bucket 46 disposed beneath the spout 45 and suspended from the conduit 44 by a coil spring 47 which is connected between the upper portion of the conduit 44 and a ring 48 detachably engaged with a hook 49 provided on the rim of bucket 46 opposite the hinged connection 50 thereof. Ring 48 is connected by a flexible cable 51 to the operating lever of a control switch 52, the switch 52 being normally closed but being opened when a predetermined amount of material collects in the bucket 46 and when the weight thereof overcomes the biasing force of the spring 47.

As shown in Figure 1, the switch 52 is connected in the energizing circuit of the motor 27, one terminal of the motor being connected to one supply line wire 53 and the other terminal of the motor being connected through a wire 54 and switch 52 to a remaining supply wire 55. Therefore, motor 27 will become energized in the absence of a predetermined quantity of material in the bucket 46. When a definite quantity of material collects in bucket 46, the weight thereof overcomes the force of spring 47 and moves the operating lever of switch 52, opening the switch and de-energizing the motor 27.

In operation, feed material 34 is placed in the hopper 31, and the feed material gravitates downwardly onto the rear portion of the distributing trough 19. Motor 27 is energized and drives the conveyor belt 26, causing the bottom run of the belt to move forwardly. The outwardly projecting distributing members 39, 40 and 41 on the belt move the feed material forwardly, causing the material to flow into and gradually fill the conduits 20, thus providing predetermined quanties of feed material to the respective feeding troughs 18. When all the conduits 20 have been filled, the excess feed material is discharged into the conduit 44 at the forward end of the feeder, said material dropping through the spout 45 into the pivoted bucket 46. When a predetermined amount of excess material collects in the bucket 46, the weight thereof overcomes the biasing force of spring 47, causing switch 52 to open and terminating operation of the conveyor by causing the motor 27 to become de-energized.

To place the feeder into operation, the ring 48 is detached from the hook 49, allowing the bucket 46 to swing downwardly, the material in the bucket being collected in a suitable receptacle placed thereunder. The empty bucket is then returned to its horizontal position with the hook 49 engaged in the ring 48. This allows switch 52 to close, allowing the motor 27 to operate, and causing the apparatus to function in the manner above described.

The excess feed material collected from the bucket 46 may be emptied into the hopper 31 along with the additional quantity of feed material necessary to replenish the chicken feeding troughs 18.

As shown in Figure 8, the stud elements 42 on the blocks secured on the flexible plate members 38 may be of any suitable length, for example, may be long enough to extend into apertures 60 provided in the endless belt 26. By making the studs 42 somewhat greater in length than the thickness of the plate members 38 an effective bond is assured between the studs 42 and the inside surfaces of the apertures 43, whereby the adhesive material employed will effectively secure said studs to the plate members 38.

While an improved chicken feeder has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a chicken feeder of the type comprising a housing, a plurality of feed troughs disposed in longitudinally spaced relation in the bottom of said housing, a horizontal longitudinally extending distributing trough mounted in the housing above said feed troughs, and respective longitudinally spaced conduits connecting said distributing trough to said feed troughs, the improvement comprising a longitudinally extending endless conveyor belt mounted in the upper portion of said housing upwardly adjacent said distributing trough, said belt comprising a flexible endless main body, longitudinally spaced flexible supporting plate members secured on said main body, and respective groups of outwardly projecting distributing blocks secured on said supporting plate members and arranged in generally V-shaped configurations.

2. In a chicken feeder of the type comprising a housing, a plurality of feed troughs disposed in longitudinally spaced relation in the bottom of said housing, a horizontal, longitudinally extending distributing trough mounted in the housing above said feed troughs, and respective longitudinally spaced conduits connecting said distributing trough to said feed troughs, the improvement comprising a longitudinally extending endless conveyor belt mounted in the upper portion of said housing upwardly adjacent said distributing trough, said belt comprising a flexible endless main body, longitudinally spaced flexible supporting plate members secured on said main body, and respective groups of outwardly projecting distributing blocks secured on said supporting plate members and arranged in generally V-shaped configurations, each group of distributing blocks comprising a generally V-shaped apex block and a plurality of successive side blocks disposed adjacent to and diverging from said apex block.

3. In a chicken feeder of the type comprising a housing, a plurality of feed troughs disposed in longitudinally spaced relation in the bottom of said housing, a horizontal, longitudinally extending distributing trough mounted in the housing above said feed troughs, and respective longitudinally spaced conduits connecting said distributing trough to said feed troughs, the improvement comprising a longitudinally extending endless conveyor belt mounted in the upper portion of said housing upwardly adjacent said distributing trough, said belt comprising a flexible endless main body, longitudinally spaced flexible supporting plate members secured on said main body, and respective groups of outwardly projecting distributing blocks secured on said supporting plate members and arranged in generally V-shaped configurations, each group of distributing blocks comprising a generally V-shaped apex block, a pair of successive side blocks disposed on each side of and diverging from said apex block, and respective tapered end blocks disposed beyond and aligned with the side blocks.

4. In a chicken feeder of the type comprising a housing, a plurality of feed troughs disposed in longitudinally spaced relation in the bottom of said housing, a horizontal, longitudinally extending distributing trough mounted in the housing above said feed troughs, and respective longitudinally spaced conduits connecting said distributing trough to said feed troughs, the improvement comprising a longitudinally extending endless conveyor belt mounted in the upper portion of said housing upwardly adjacent said distributing trough, said belt comprising a flexible endless main body, longitudinally spaced flexible supporting plate members secured on said main body, and respective groups of outwardly projecting distributing blocks secured on said supporting plate members and arranged in generally V-shaped configurations, each group of distributing blocks comprising a generally V-shaped apex block, a pair of successive side blocks disposed on each side of and diverging from said apex block, outwardly projecting triangular brace ribs on the side blocks having bottom edges adhesively secured to the flexible supporting plate members, and respective tapered end blocks disposed beyond and aligned with the side blocks.

References Cited in the file of this patent

UNITED STATES PATENTS

| | | |
|---|---|---|
| 2,264,332 | Peterson | Dec. 2, 1941 |
| 2,681,639 | Littlefield | June 22, 1954 |